United States Patent
Beck et al.

[11] Patent Number: 5,998,785
[45] Date of Patent: Dec. 7, 1999

[54] PROTECTIVE DEVICE OPERATING WITHOUT CONTACT, IN PARTICULAR LIGHT BARRIER GRID

[75] Inventors: Michael Beck, Waldkirch; Harald Hettich, Gundelfingen; Karl-Heinz Süss, Waldkirch, all of Germany

[73] Assignee: Sick AG, Waldkirch/Breisgau, Germany

[21] Appl. No.: 08/821,891

[22] Filed: Mar. 21, 1997

[30] Foreign Application Priority Data

Jun. 13, 1996 [DE] Germany ............ 196 23 651

[51] Int. Cl.$^6$ ........................... H01J 5/02
[52] U.S. Cl. ................ 250/239; 250/216; 340/555
[58] Field of Search .............. 250/239, 221, 250/216; 340/555, 556, 557

[56] References Cited

U.S. PATENT DOCUMENTS

| | | | |
|---|---|---|---|
| 4,021,665 | 5/1977 | Hass et al. | 250/239 |
| 5,015,840 | 5/1991 | Blau | 250/221 |
| 5,115,129 | 5/1992 | Johnson | 250/239 |
| 5,490,323 | 2/1996 | Thacker et al. | 128/634 |

FOREIGN PATENT DOCUMENTS

| | | |
|---|---|---|
| 1 925 781 | 11/1970 | Germany . |
| 7627230 | 8/1976 | Germany . |
| 24 53 097 C3 | 8/1981 | Germany . |
| 35 11 642 A1 | 10/1985 | Germany . |
| 39 00 210 A1 | 7/1990 | Germany . |
| 43 17 931 A1 | 12/1994 | Germany . |
| 43 23 902 A1 | 1/1995 | Germany . |
| 44 38 798 A1 | 5/1996 | Germany . |

OTHER PUBLICATIONS

Homburg, D., et al., "Lichtschrankenbau: Leistungsfähige Elektronik plus robuste Mechanik", in: F & M 101 (1993) pp. 123–125.

Primary Examiner—Edward P. Westin
Assistant Examiner—Kevin Pyo
Attorney, Agent, or Firm—Townsend and Townsend and Crew LLP

[57] ABSTRACT

A protective device operating in contact-free manner, such as in particular a light barrier grid (10), including a transmitter unit and/or a receiver unit (12) for generating and/or for receiving sensing signals, such as in particular light signals which serve for the contact-free monitoring of a protective area. At least the transmitter unit and/or the receiver unit (12) of the protective device is accommodated in a pressure-tight, preferably tubular housing (14), which is at least partly permeable for the sensing signals and which in particular includes cable lead-throughs (16) which ensure explosion protection.

13 Claims, 1 Drawing Sheet

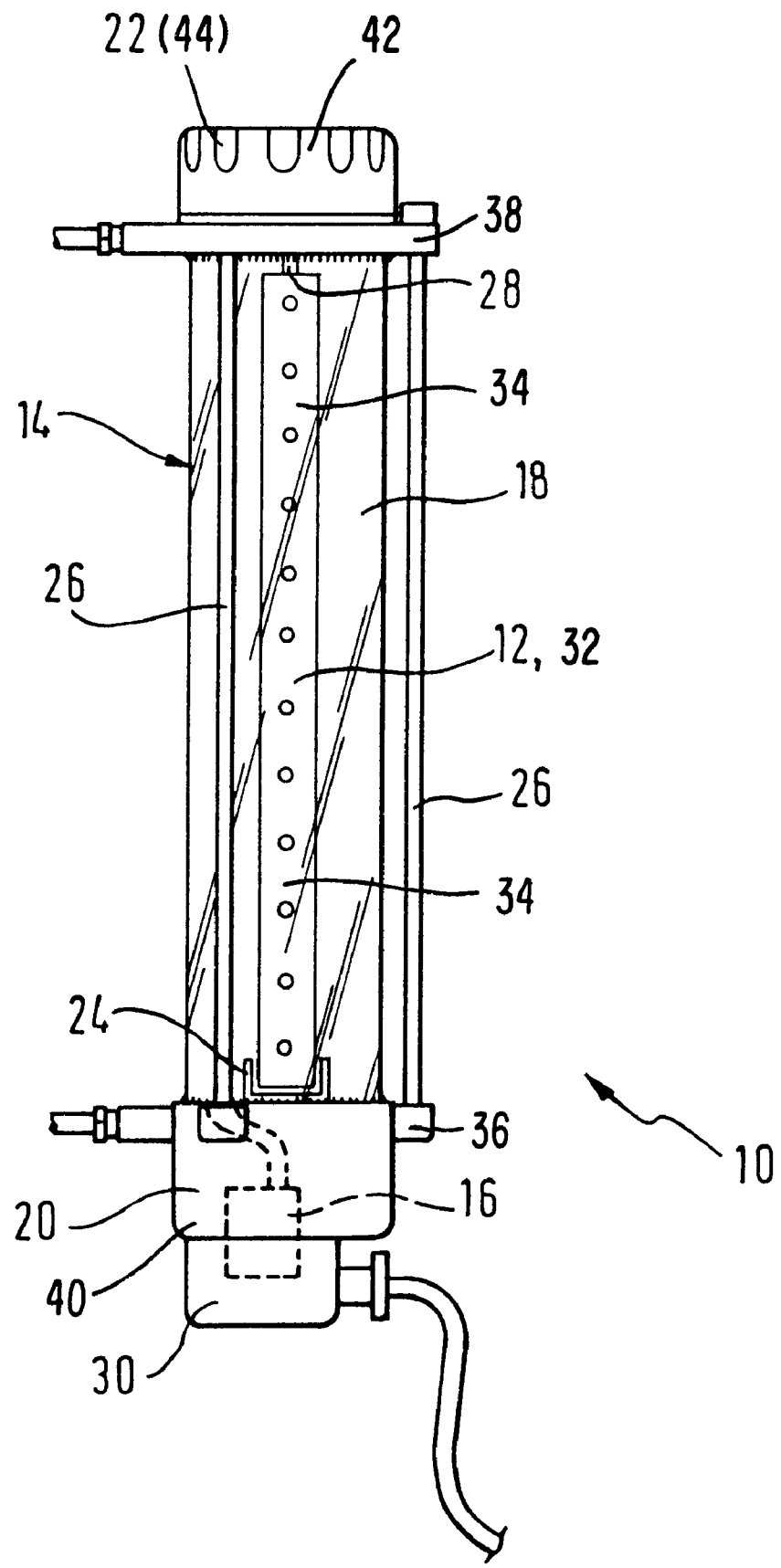

PROTECTIVE DEVICE OPERATING WITHOUT CONTACT, IN PARTICULAR LIGHT BARRIER GRID

FIELD OF THE INVENTION

The invention relates to a protective device operating in contact-free manner, in particular a light barrier grid, having a transmitter unit and/or a receiver unit for generating and/or for receiving sensing signals, such as for the contact-free monitoring of a protective area.

DESCRIPTION OF PRIOR ART

In certain applications protective devices of the initially named kind are also used in areas where an increased danger of explosion exists. The requirements which must be observed in this connection with respect to explosion protection are, as a rule, relatively high.

It is known to operate protective devices for the area endangered by explosions and which operate without contact in the so-called ignition protection class "p", i.e. by means of flushing air. The corresponding devices are, however, extremely costly and relatively susceptible to breakdown.

OBJECT OF THE INVENTION

It is an object of the invention is to provide a protective device of the initially named kind which operates without contact, by means of which stricter requirements related to explosion protection can be reliably observed in a simple and cost-favorable manner.

BRIEF DESCRIPTION OF THE INVENTION

According to the invention at least the transmitter unit and/or the receiver unit of the protective device is accommodated in a pressure-tight, preferably tubular housing, which is at least partly permeable for the sensing signals and which includes conductor or cable lead-throughs ensuring protection against explosion.

As a result, the protective device which operates without contact can meet even higher requirements relating to explosion protection reliably and without problem, and without requiring flushing air for its operation. The desired explosion protection is already achieved by the pressure-tight housing provided with corresponding cable lead-throughs, with the additional expense and complexity being kept low.

An integrated transmitter unit and receiver unit of the protective device operating without contact can be accommodated in the pressure-tight, preferably tubular housing. Moreover, the transmitter unit and/or receiver unit accommodated in the pressure-tight, preferably tubular housing can also include an electronic control and/or evaluation system.

In a preferred embodiment the housing includes a tube consisting of light-permeable material which is provided with a respective closure cap at at least one end and preferably at both ends. The tube advantageously consists of glass. The length of the tube consisting of a light-permeable material preferably corresponds at least substantially to the extent of the protective area measured in the direction of the tube. A plurality of tubes of different lengths can be made available, so that one can be selected which has the needed length for protecting the desired area.

It is of particular advantage when the tube consisting of light-permeable material optically influences the light passing through in the light entry region or light exit region defining the protected area, for example in the manner of a lens. The tube which serves for explosion protection thus simultaneously serves as an optical device, further simplify the layout of the protective device.

A mount, holder or the like for the unit of the protective device which is to be encapsulated in a pressure-tight manner is expediently provided at the inner side of a closure cap. A mount of this kind can for example be of fork-like design, which facilitates the insertion of the unit which is to be encapsulated in pressure-tight manner.

The cable lead-throughs are expediently provided in a closure cap. In a closure cap of this kind, cable lead-throughs which satisfy even stricter requirements related to explosion protection can be realized without any problem.

In an embodiment which is preferred in practice the closure caps provided at the two ends of the tube are firmly connected together, while including the tube between them, by threaded bars which extend along the tube exteriorly thereof to ensure a reliable, pressure-tight encapsulation of the relevant units of the protective device.

In order to enable problem-free adjustment of the protective device, at least one closure cap is advantageously provided with an outer holder which permits an adjustment about at least two and preferably three axes.

BRIEF DESCRIPTION OF THE FIGURE

The invention will be described in more detail in the following with reference to an embodiment and to the drawing. The single FIGURE of the drawing shows a schematic, greatly simplified illustration of a light barrier grid having a housing encapsulated in pressure-tight manner.

DESCRIPTION OF THE PREFERRED EMBODIMENT

The light barrier grid 10 illustrated in the FIGURE comprises an integrated transmitter and receiver unit 12 for producing and receiving electromagnetic, e.g. light, signals which serve for the contact-free monitoring of a protected area.

The transmitter and receiver unit 12, which can, include an electronic control and/or evaluation system 32, is accommodated in a pressure-tight, encapsulated housing 14, which is provided with cable lead-throughs 16 ensuring protection against explosion.

The housing 14 includes a glass tube 18 permeable for the light signals, which is provided at each of its two ends with a respective closure cap 20, 22. The glass tube 18, which has a relatively large wall thickness can, for example, have an outer diameter of about 132 mm.

The length of the glass tube 18 is matched to the respective height of the protective field of the transmitter and receiver unit 12 which is to be built in. Different glass tubes 18 can be made available for different protective field heights.

The glass tube 18, which is permeable for the light signals, can be conceived so that it optically influences the light passing through, in particular in the manner of a lens, in the light entry and the light exit region 34 defining the protected area.

A mount 24, which in the present case is generally fork-like, is provided at the inner side of the lower closure cap 20 for the integrated transmitter and receiver unit 12 which is to be encapsulated in pressure-tight manner. The oppositely disposed upper closure cap 22 is provided at its inner side with a device 28 for centering the in-built light and receiver unit 12. The cable lead-throughs 16, which have been checked to see that they are explosion-proof, are provided in the illustrated embodiment in the lower closure cap 20 with a protective hood 30 which is preferably provided with a PG thread and is mounted thereon. These cable lead-throughs can indeed fundamentally also be provided in the upper closure cap 22. This is, however, less suited for this purpose because it is preferably executed in the present embodiment as a rotary lid which can be screwed into place, and thus the potted part of the lead-through sitting therein together with the attached cables would have to be rotated when it is closed. The transmitter and receiver unit 12 is connected to the cable lead-throughs 16 in the space which is to be encapsulated in pressure-tight manner prior to delivery of the light barrier grid. The other side of the cable lead-through 16 ends with connection support points in a non-illustrated connection space, which must likewise satisfy the respective requirements concerning explosion protection. For this purpose secured threaded connections or the like can, for example, be provided. The connection space also contains cable lead-throughs 16 ensuring explosion protection. In a practical embodiment this connection space is closed off by a threaded cap or the like.

The closure caps 20, 22 provided at the two ends of the glass tube 18 are fixedly connected together, while including the glass tube 18 between them, by threaded bars 26 which extend exteriorly along the tube. The glass tube 18 is thus firmly held between the and, typically, both closure caps 20, 22.

At least one of the two closure caps 20, 22 can include a ring 36, 38, for example consisting of aluminum, which is fixedly mounted at the relevant end face of the glass tube 18 and a cap which can be screwed onto this ring. This ring can be provided with a holder for the mounting of the light barrier grid 10. When rings 36, 38 are used, the caps are preferably formed as covers which can be screwed onto the rings.

An outer holder 44 is expediently attached to each closure cap 20, 22 and permits an adjustment about two or three axes.

In the present case the cable lead-throughs 16 are laid out for a six-pole connection. A seventh connection is connected to the parts of the housing 14 consisting of metal.

What is claimed is:

1. Protective device operating without contact comprising a light barrier grid including at least one of a transmitting unit and a receiving unit for respectively producing and receiving sensing signals for the contact-free monitoring of a protected area, a pressure-tight tubular housing which is at least partly permeable for the sensing signals, at least said one of the transmitting unit and the receiving unit of said light barrier grid being disposed in the pressure-tight housing, and cable lead-throughs extending from an exterior to an interior of the housing ensuring protection against explosion, the housing comprising a tube made of a light-permeable material and including a closure cap at each end of the tube, the tube having a length corresponding at least substantially to an extent of the protected area measured in a longitudinal direction of the tube, the cable lead-throughs extending through at least one of the caps, a holder for the at least one of the units of the protective device and a device for centering the at least one of the units, the holder and the device being provided at inner sides of the respective closure caps, and threaded bars extending exteriorly along the tube firmly connecting the closure caps and the tube together.

2. Protective device in accordance with claim 1 wherein said at least one of the transmitting unit and the receiving unit comprises an integrated transmitter unit and receiver unit in the interior of the pressure-tight housing.

3. Protective device in accordance with claim 1 wherein said at least one of the transmitting unit and receiving unit in the pressure-tight housing includes an electronic control and/or evaluation system.

4. In a light curtain arrangement for the contact-free monitoring of an area protected by a narrow, elongated light curtain formed by electromagnetic signals impacting along a line defining a border of the protected area, improvement comprising a device including an elongated tubular housing having open ends for positioning of the tubular housing along the line; at least one of a transmitting unit and a receiving unit for the electromagnetic signals impacting along the line disposed inside the housing; the housing extending substantially over the length of the unit, surrounding the unit and being constructed of a material permitting passage of the electromagnetic signals therethrough; a closure closing each open end of the tubular housing, the closures and the tubular housing being pressure-tight and sealing an inside of the tubular housing from an exterior thereof; and through-leads extending in a pressure-tight manner from the exterior of the tubular housing through a closure to the inside of the tubular housing, whereby the electromagnetic signals can be transmitted and/or sensed by the unit over substantially a full length of the tubular housing when it is positioned to substantially align the at least one of the units with the line.

5. Protective device in accordance with claim 1 wherein the tube consists of glass.

6. Protective device in accordance with claim 1 wherein the at least one closure cap is made of a lightweight metal.

7. Protective device in accordance with claim 1 wherein the light-permeable material is selected to optically influence light passing through a light entry region and a light exit region defining the protected area.

8. Protective device in accordance with claim 1 wherein at least one closure cap is provided with an outer holder permitting adjustment about at least two axes.

9. Protective device in accordance with claim 1 wherein the holder is fork-shaped.

10. A protective device according to claim 7 wherein the tube operates as a lens.

11. A protective device according to claim 8 wherein the outer holder permits adjustment about three axes.

12. Protective device in accordance with claim 1 wherein at least one closure cap includes a ring which is firmly seated on an end face of the tube, the closure cap defining a cover adapted to be screwed onto the ring.

13. Protective device in accordance with claim 12 including a holder at the ring for mounting the protective device.

* * * * *